J. A. HEANY.
ELECTRODE FOR ELECTRIC WELDING MACHINES.
APPLICATION FILED OCT. 7, 1912.
1,061,376.
Patented May 13, 1913.
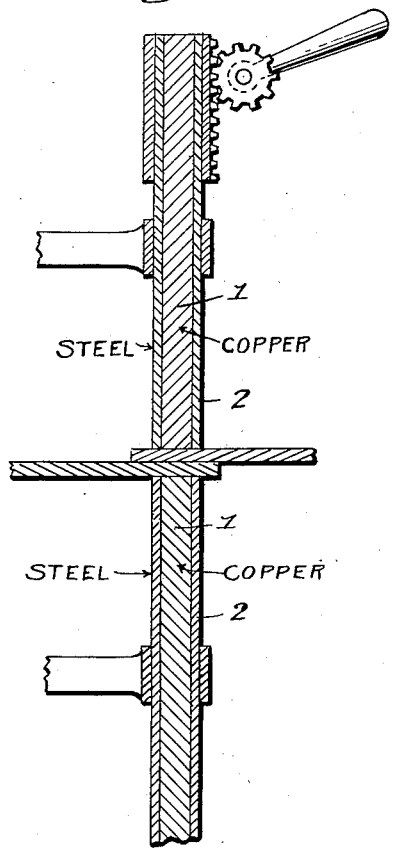
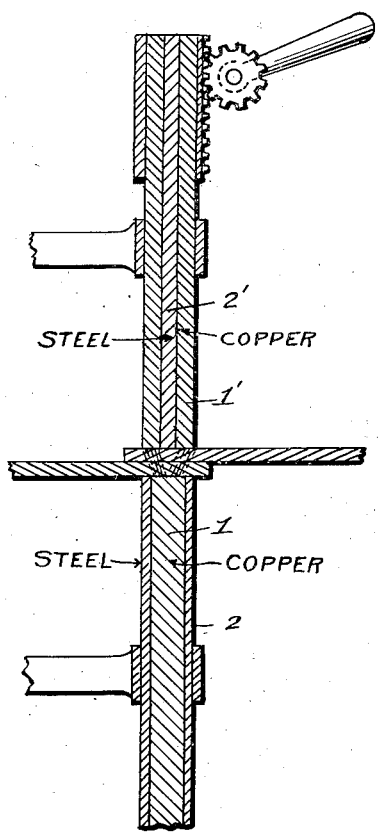

UNITED STATES PATENT OFFICE.

JOHN ALLEN HEANY, OF WASHINGTON, DISTRICT OF COLUMBIA.

ELECTRODE FOR ELECTRIC WELDING-MACHINES.

1,061,376.

Specification of Letters Patent. Patented May 13, 1913.

Application filed October 7, 1912. Serial No. 724,313.

*To all whom it may concern:*

Be it known that I, JOHN ALLEN HEANY, a citizen of the United States, residing in the city of Washington, District of Columbia, have invented certain new and useful Improvements in Electrodes for Electric Welding-Machines; and I do hereby declare the following to be a full, clear, and exact description of the invention, such as will enable others skilled in the art to which it appertains to make and use the same.

The present invention relates to an improved electrode for electric welding, and more particularly spot welding, in which the electrodes are forced against the work with considerable pressure to effect a homogeneous union of the metals at the weld.

Heretofore, it has been customary to employ electrodes made of copper for welding machines, but considerable difficulty has been encountered owing to the fact that the high heat generated at the weld softens the copper to such an extent that the ends of the electrodes tend to flatten out or mushroom when pressure is applied thereto, which unduly increases the area of contact between the electrode and the work and produces an uneven distribution of the current and non-homogeneous weld. In order to overcome this difficulty, it is proposed to construct an electrode of the usual pencil-like form having incorporated in the body thereof a good electrical conductor, such as copper, associated with and reinforced by a metal, or other suitable material, having a high compression factor to withstand compression stresses even when heated, such as steel, one of the elements preferably being incased or surrounded by the other.

In the accompanying drawings, Figure 1 is a vertical longitudinal section through the electrode portion of an electric welder illustrating one form of the invention. Fig. 2 is a similar view showing a modification.

Referring to Fig. 1 of the drawings, the numeral 1 indicates the core of the electrode, which is preferably formed of copper, of sufficient diameter to conduct the welding current to and from the work. The core 1 is surrounded by a sheath or casing, which may be conveniently made of steel and which is securely attached to the core, as indicated. The electrodes are applied to the welding machine in the usual manner, one of said electrodes being movable by appropriate manually controlled means, as indicated, in order to clamp the work between the two electrodes and to impose sufficient pressure on the work to effect a homogeneous weld. The central copper core affords a path of high conductivity for the heavy current and is brought into intimate contact with the surfaces of the work, while the sheathing of steel or other material having a high compression factor serves to transmit the pressure to the work and at the same time to wholly relieve the tendency of the copper core to upset or flatten out. Obviously, the particular relation and arrangement of the two elements of the electrode may be varied, as for example by forming the electrode with a core of steel or the like and an outer sheathing of copper or by embedding one or more steel rods in the body of the copper electrode.

In Fig. 2, the upper electrode is constructed in accordance with the first mentioned modification, to wit, with a relatively small core 2' of steel or the like and an outer heavy sheathing or casing 1' of copper. The lower electrode may be of the form shown in Fig. 1. When the two types of electrode are employed, it will be noted that the path of the current from the upper electrode to the lower will take the form of an inverted frustum of a cone, inasmuch as the current will seek the shortest path from the copper section of one electrode to the copper section of the other electrode, which would have the effect of concentrating the heat developed by the current to a restricted area in the work between the electrodes.

What I claim is:—

1. An electrode for electric welding comprising a metal of high electric conductivity, and a reinforcing member having a relatively high compression factor, the conducting metal and the reinforcing member being so disposed as to admit of both being brought simultaneously into intimate contact with the work.

2. An electrode for electric welding, comprising a metal of high electric conductivity, and a reinforcing metal having a high compression factor.

3. An electrode for electric welding comprising concentric connected bodies of copper and a metal having a high compression factor.

4. An electrode for electric welding comprising a composite rod of copper and steel, one of the component metals being surrounded by the other.

In testimony whereof I affix my signature, in presence of two witnesses.

JOHN ALLEN HEANY.

Witnesses:
   FRED. B. McLAREN,
   CHAS. J. O'NEILL.